United States Patent [19]

Kumasaka et al.

[11] Patent Number: 4,748,089
[45] Date of Patent: May 31, 1988

[54] MULTILAYERED FERROMAGNETIC AMORPHOUS ALLOY FILM AND MAGNETIC HEAD EMPLOYING THE SAME

[75] Inventors: Noriyuki Kumasaka, Ome; Kazuo Shiiki, Tsukui; Shigekazu Otomo, Sayama; Yoshihiro Shiroishi, Hachioji; Takeo Yamashita, Hachioji; Noritoshi Saito, Hachioji; Kiminari Shinagawa, Chiba; Mitsuhiro Kudo, Nishitoma, all of Japan

[73] Assignee: Hitachi, Ltd., Tokyo, Japan

[21] Appl. No.: 681,261

[22] Filed: Dec. 13, 1984

[30] Foreign Application Priority Data

Dec. 16, 1983 [JP] Japan .................. 58-236172

[51] Int. Cl.⁴ .................. G11B 5/31; H01F 10/08
[52] U.S. Cl. .................. 428/635; 428/668; 428/679; 428/680; 428/681; 428/926; 428/928
[58] Field of Search .............. 428/928, 611, 678, 668, 428/679, 680, 635, 926, 681, 682; 360/126

[56] References Cited

U.S. PATENT DOCUMENTS

| 4,079,430 | 3/1978 | Fujishima et al. | 360/126 |
|---|---|---|---|
| 4,312,683 | 1/1982 | Sakakima et al. | 148/31.55 |
| 4,325,733 | 4/1982 | Aboaf et al. | 75/123 M |
| 4,364,020 | 12/1982 | Lin et al. | 336/212 |
| 4,433,474 | 2/1984 | Hemmat | 148/108 |
| 4,506,248 | 3/1985 | Lin | 336/212 |
| 4,565,746 | 1/1986 | Hayase | 428/928 |
| 4,610,935 | 9/1986 | Kumasaka et al. | 428/928 |

FOREIGN PATENT DOCUMENTS

| 114076 | 7/1984 | European Pat. Off. | |
| 58125 | 5/1981 | Japan | 360/126 |
| 128018 | 7/1983 | Japan | 360/126 |

OTHER PUBLICATIONS

Aboaf et al., IBM Technical Disclosure Bulletin, vol. 22, No. 12, May 1980, pp. 5518-5519.
Lazzari et al., IEEE Transactions on Magnetics, vol.-May 17, No. 6, Nov. 1981, pp. 3120-3122.
Patents Abstracts of Japan, vol. 6, No. 195 (P-146) [1073], Oct. 5, 1982; & JP-A-57 105 838 (Ricoh K.K) 01-07-82 Abstract.

*Primary Examiner*—John J. Zimmerman
*Attorney, Agent, or Firm*—Antonelli, Terry & Wands

[57] ABSTRACT

A multilayered ferromagnetic amorphous alloy film is constituted by a plurality of main ferromagnetic material alloy films of a ferromagnetic amorphous alloy laminated one upon another with a spacer ferromagnetic material layer interposed therebetween, the spacer ferromagnetic material layer being of a ferromagnetic material different from the ferromagnetic alloy. Also disclosed is a magnetic head employing the above-described multilayered film for, at least, a portion of a core thereof. The multilayered film has excellent magnetic characteristics and is easily patterned.

17 Claims, 3 Drawing Sheets

MULTILAYERED FERROMAGNETIC AMORPHOUS ALLOY FILM AND MAGNETIC HEAD EMPLOYING THE SAME

BACKGROUND OF THE INVENTION

The present invention relates to a multilayered ferromagnetic amorphous alloy film having both high saturation flux density and low coercive force and a magnetic head for magnetic recording and reproducing employing the multilayered ferromagnetic amorphous alloy film. More particularly, the invention pertains to a magnetic head core material for high density magnetic recording and a magnetic head employing the same.

Ferromagnetic amorphous alloys do not have magnetocrystalline anisotropy on account of their amorphous properties and therefore display excellent characteristics as soft magnetic materials which make it possible to obtain high-permeability characteristics over a wide range of composition and to obtain a high saturation flux density higher than 10 KG. When a ferromagnetic metal film is employed as a magnetic head core material, a method has hitherto been adopted in which ferromagnetic metal films are laminated with an insulator, such as $SiO_2$ or $Al_2O_3$, interposed therebetween to form a multilayered ferromagnetic film, in order to ensure high permeability as far as a high-frequency region. However, when a multilayered ferromagnetic amorphous alloy film formed by laminating ferromagnetic amorphous alloy films with an insulator interposed therebetween is employed for a thin film magnetic head, edge portions of the multilayered film are not properly formed during a patterning process, which disadvantageously involves incapability of obtaining the dimensional accuracy required. Further, ply separation may undesirably occur since there is a large difference in thermal expansion coefficient between the insulator and the ferromagnetic amorphous alloy.

The following references are cited to show the state of the art; (i) Japanese Utility Model Laid-Open No. 58,613/1977, (ii) Japanese Patent Laid-Open No. 54,408/1977, and (iii) Japanese Patent Laid-Open No. 84,019/1980.

SUMMARY OF THE INVENTION

It is a primary object of the present invention to overcome the above-described disadvantages of the prior art and to provide a multilayered ferromagnetic amorphous alloy film which has low coercive force and high permeability as well as high saturation flux density and is easily patterned as well as is free from ply separation, particularly a thin-film ferromagnetic material having excellent characteristics as a material for a magnetic head core and further to provide a magnetic head excellent in recording and reproducing characteristics which employs the above-described material for, at least, a portion of the core thereof.

To this end, according to the invention, there is provided a multilayered ferromagnetic amorphous alloy film comprising a plurality of main ferromagnetic material films of a ferromagnetic amorphous alloy which are laminated with another ferromagnetic material interposed therebetween as a spacer material layer.

The present inventors have found the fact that it is possible to obtain a multilayered ferromagnetic amorphous alloy film of the present invention having both low coercive force and high saturation flux density and displaying high permeability even in a high-frequency region by employing a spacer material layer of a ferromagnetic material in place of the conventional spacer material layer of a non-magnetic insulating material employed when ferromagnetic amorphous alloy films are laminated to form a multilayered ferromagnetic amorphous alloy film. Further, the multilayered ferromagnetic amorphous alloy film of the invention is free from ply separation and can be patterned into a predetermined shape with advantageously high accuracy by either the wet or dry etching method.

FIG. 1 is a sectional view of one example of the structure of the multilayered ferromagnetic amorphous alloy film of the invention. In the Figure: the reference numeral 10 denotes a main ferromagnetic material film including as its principal component at least one selected from the group consisting of Co, Fe and Ni; the numeral 11 a spacer ferromagnetic material layer of a polycrystalline or amorphous ferromagnetic material; and the numeral 12 a substrate.

As the main ferromagnetic material film 10 is employed a known binary system amorphous alloy, for example, a Co-Zr system, Co-Nb system or Co-Ti system amorphous alloy, or an alloy formed by adding W, Mo, Ti, Nb, Ta, Si, B or the like to a binary system amorphous alloy selected from the above-described alloys for adjustment of magnetostriction and crystallization temperature. Further, a known Fe-B system, Fe-Si-B system, Fe-Co-Si-B system or Co-Ni-Zr system amorphous alloy may be employed as the main ferromagnetic material film 10. In practice, the magnetostriction constant $\lambda_s$ of the main ferromagnetic material film 10 is preferably selected to fall between $5 \times 10^{-6}$ and $-5 \times 10^{-6}$. Other particularly preferable magnetic characteristics of the main ferromagnetic material film 10 are as follows: the saturation flux density is 10 KG or higher; and the coercive force is 1 Oe or less.

As the ferromagnetic polycrystalline material film constituting the spacer ferromagnetic material layer 11 is employed a ferromagnetic element, such as Co, Ni, Fe, or a ferromagnetic alloy, such as Ni-Fe (Permalloy) or Fe-Al-Si (Sendust). As the spacer ferromagnetic amorphous alloy layer is employed an alloy of a constituent element combination different from that of the main ferromagnetic material film. It is particularly preferable that the spacer ferromagnetic material layer should also have a magnetostriction constant of $5 \times 10^{-6}$ to $-5 \times 10^{-6}$ and a coercive force not exceeding 1 Oe. However, any ferromagnetic material which is different from the main ferromagnetic material film (i.e., a ferromagnetic material which is different from the main ferromagnetic material film in the principal component element or the atomic arrangement) can satisfactorily provide the effects of the present invention.

The above-mentioned ferromagnetic material films and layers can be formed by a known thin film formation technique, such as sputtering or evaporation.

Each main ferromagnetic material film 10 preferably has a film thickness of 0.05 μm to 2 μm. A film thickness less than 0.05 μm suddenly increases the coercive force. On the other hand, a film thickness in excess of 2 μm gradually increases the coercive force, which impairs the high-frequency characteristics of the permeability and increases variations in magnetic characteristics.

Each spacer ferromagnetic material layer 11 preferably has a layer thickness of 10 Å to 200 Å. A layer thickness less than 10 Å hardly offers the effect of the spacer material layer. A layer thickness in excess of 200

Å undesirably makes the spacer material layer display its own magnetic properties, resulting in an increase in the coercive force and a reduction in the permeability. A more preferable layer thickness is 20 Å to 100 Å. It suffices for construction of the multilayered film only to laminate two or more main ferromagnetic material films one upon another with one spacer material layer interposed therebetween. If the thickness ratio between each main ferromagnetic material film and the spacer ferromagnetic material layer is selected to fall between 5:1 to 50:1, more preferably 5:1 to 20:1, then it is possible to obtain particularly excellent magnetic characteristics, although it is not necessary to limit the thickness ratio to the above-described ranges.

The multilayered ferromagnetic amorphous alloy film of the present invention, having the above-described multilayered structure, has small coercive force and high permeability which is maintained even in a high-frequency region and is easily patterned into a predetermined shape as well as is free from ply separation. Thus, the multilayered ferromagnetic amorphous alloy film displays excellent characteristics as a magnetic head core material. Further, it is possible to obtain a film smaller in variations of magnetic characteristics than a single layered ferromagnetic amorphous alloy film.

Moreover, the magnetic head in accordance with the present invention employs the multilayered ferromagnetic amorphous alloy film of the invention for, at least, a portion of the core thereof, whereby the recording/reproducing output of the magnetic head is remarkably increased. Further, it is easy to effect precise patterning of a magnetic pole of the magnetic head, and there is no possibility of ply separation of the multilayered film constituting the magnetic pole portion.

In particular, it is preferable to employ the multilayered ferromagnetic amorphous alloy film of the invention for, at least, a portion on the the magnetic recording medium side of the magnetic pole which effects generation or both generation and detection of a signal magnetic field. The above-described portion of the magnetic head at which an advantageous result can be obtained by the use of the multilayered film of the invention is a ferromagnetic material portion in the vicinity of a magnetic gap in the case of a ring type head; it is a ferromagnetic material portion at the distal end of the main pole in the case of a perpendicular magnetic recording head having a main pole and an auxiliary pole.

DESCRIPTION OF THE PRESENTLY PREFERRED EMBODIMENTS

The present invention will be described hereinunder in detail through embodiments thereof.

First of all, a description will be made of the formation of a ferromagnetic material film which is common to the following embodiments.

Figure 1:
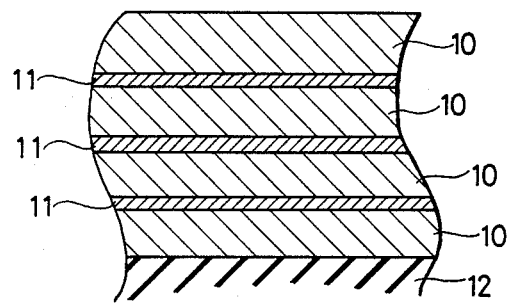
FIG. 1 is a sectional view of one example of the structure of a multilayered ferromagnetic amorphous alloy film in accordance with the present invention.
Figure 2:
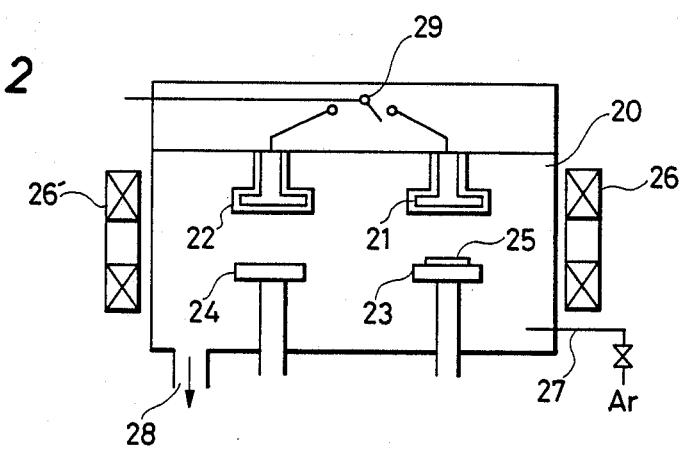
FIG. 2 is a schematic illustration of the arrangement of a sputtering apparatus for forming a ferromagnetic material film in one embodiment of the present invention.

The ferromagnetic material film is formed by the use of an RF sputtering apparatus such as that shown in FIG. 2. The apparatus has two independent sets of two facing electrodes disposed within a vacuum chamber 20. Electrodes 21, 22 are target electrodes (cathode). A target for forming a main ferromagnetic material film (a ferromagnetic amorphous alloy film) is disposed on the electrode 21. Employed is a composite type target formed by attaching to a Co substrate a small substrate for forming an amorphous alloy, such as W, Nb, Mo, Ta or Zr. On the electrode 22 is disposed a target of Co, Ni, Fe, an Ni-Fe alloy (Permalloy) or an Fe-Al-Si alloy (Sendust) for forming a ferromagnetic polycrystalline material film as a spacer ferromagnetic material layer or a target for forming a ferromagnetic amorphous alloy film as a spacer ferromagnetic material layer. On the other hand, the electrodes 23, 24 are substrate electrodes (anode) respectively provided directly below the target electrodes 21, 22. The arrangement is such that it is possible to move a substrate 25 between the substrate electrodes 23, 24 in accordance with purposes. If necessary, a magnetic field is applied within the surface of the substrate 25 by means of electromagnets 26, 26' during sputtering in order to control the axis of easy magnetization of the ferromagnetic material film formed. It is to be noted that electric discharge is carried out in argon gas, which is introduced into the vacuum chamber 20 from a gas inlet pipe 27. The reference numeral 28 denotes an exhaust hole of the chamber 20, while the numeral 29 represents an electrode changeover switch.

In the following embodiments 1 to 3, as the substrate 25, Photoceram (a trade name, manufactured by Corning Works, U.S.A.) was employed.

In order to relatively easily form a ferromagnetic material film by sputtering, the following various conditions were selected:

| | |
|---|---|
| RF power density | 0.5 w/cm$^2$ |
| Argon pressure | 5 × 10$^{-3}$ Torr |
| Substrate temperature | 150° C. |
| Distance between electrodes (cathode and anode) | 50 mm |

The film arrangement and magnetic characteristics of the multilayered ferromagnetic amorphous alloy films prepared under the above-described conditions will be described through the following embodiments 1 to 3.

Embodiment 1

Table 1 shows one example of the magnetic characteristics (shown are average values of those of ten samples) of multilayered films each constituted by a main ferromagnetic material film of an amorphous alloy consisting of $Co_{90.5}Zr_{9.5}$ (composition ratios in the following formulae will be represented by atomic %), and a spacer ferromagnetic material layer of an amorphous alloy consisting of $Co_{80}Nb_{20}$.

Figure 3:
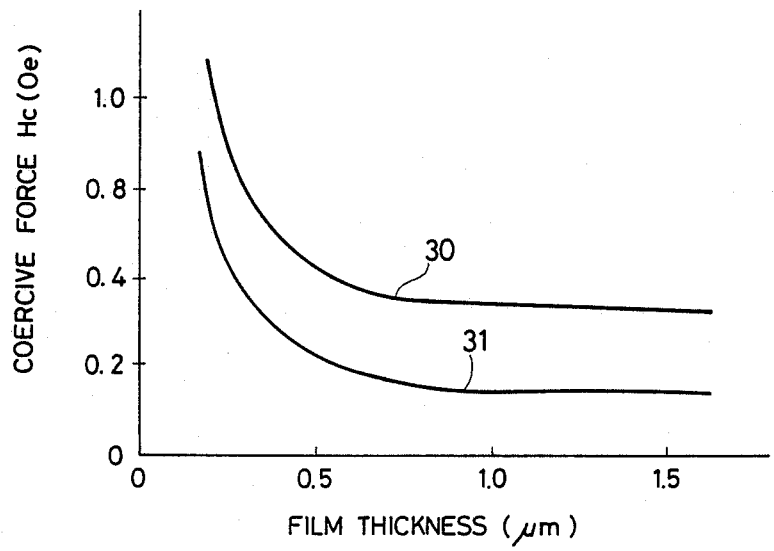
FIG. 3 is a graph showing the relationship between the coercive force and the film thickness of a conventional single layered film and a multilayered ferromagnetic amorphous alloy film in accordance with one embodiment of the present invention.

In the ten multilayered films each constituted by four main ferromagnetic material film layers of $Co_{90.5}Zr_{9.5}$ each having a thickness of 0.1 μm and three spacer ferromagnetic material layers of $Co_{80}Nb_{20}$ each having a thickness of 50 Å, the most preferable one had a saturation flux density Bs of 14 KG, a coerdive force Hc of 0.2 Oe and a relative permeability μ of 4,000 at 5 MHz. FIG. 3 shows the dependence of the coercive force on the film thickness with respect to a conventional single layered film of $Co_{90.5}Zr_{9.5}$ and a multilayered film of $Co_{90.5}Zr_{9.5}$ (0.1 μm) / $Co_{80} Nb_{20}$ (50 Å) in accordance with the present invention. In FIG. 3, the curve 30 represents the former, while the curve 31 represents the latter (in the case of the present invention). As will be clear from the Figure, the multilayered film of the invention gives a coercive force smaller than that given by the conventional single layered film at the same film thickness. Further, no ply separation was found in the multilayered film of the invention, and the multilayered film had high patterning accuracy.

TABLE 1

| No. | Main ferromagnetic material film $Co_{90.5}Zr_{9.5}$ | Spacer ferromagnetic material layer $Co_{80}Nb_{20}$ | Entire film thickness (μm) | Bs (KG) | Hc (Oe) | μ 5 MHz |
|---|---|---|---|---|---|---|
| 1 | 0.05 μm (4 layers) | 50 Å (3 layers) | 0.2 | 13.5 | 0.5 | 2000 |
| 2 | 0.1 μm (4 layers) | 50 Å (3 layers) | 0.4 | 14 | 0.3 | 3000 |
| 3 | 0.1 μm | 100 Å | 0.4 | 13 | 0.4 | 3000 |
| 4 | 0.2 μm (10 layers) | 100 Å (9 layers) | 2.1 | 14 | 0.25 | 2000 |

On the other hand, when the spacer material layer was constituted by $SiO_2$ in place of the above-described $Co_{80}Nb_{20}$, there was possibilities of ply separation. Further, in this case, when the multilayered film was patterned by the photoetching method, the patterning accuracy was remarkably low as compared with the multilayered ferromagnetic amorphous alloy film of the invention, as described later in the embodiment 4.

Embodiment 2

Table 2 shows one example of the magnetic characteristics (shown are average values of those of ten samples) of multilayered films each constituted by a main ferromagnetic material film of an amorphous alloy consisting of $Co_{90.5}Zr_{9.5}$ and a spacer ferromagnetic material layer of a polycrystalline Permalloy having a composition consisting of 80 wt % Ni-20 wt % Fe (the composition ratio of only this alloy will be shown by weight %, hereinafter).

As shown in Table 2, it was possible to obtain magnetic characteristics substantially equal to those shown in Table 1 even when a polycrystalline 80Ni-20Fe alloy was employed as the spacer ferromagnetic, material layer.

Further, similar to the embodiment 1, the embodiment 2 offered a multilayered film free from ply separation and high in patterning accuracy.

Accordingly, it has been found that, similar to that obtained in the embodiment 1, the multilayered ferromagnetic amorphous alloy film obtained in this embodiment remarkably excels the conventional one.

TABLE 2

| No. | Main ferromagnetic material film $Co_{90.5}Zr_{9.5}$ | Spacer ferromagnetic material layer 80Ni—20Fe | Entire film thickness (μm) | Bs (KG) | Hc (Oe) | μ 5 MHz |
|---|---|---|---|---|---|---|
| 5 | 0.05 μm (4 layers) | 50 Å (3 layers) | 0.2 | 13.5 | 0.5 | 2000 |
| 6 | 0.1 μm (4 layers) | 50 Å (3 layers) | 0.4 | 14 | 0.3 | 3000 |
| 7 | 0.1 μm (4 layers) | 100 Å (3 layers) | 0.4 | 13 | 0.3 | 3000 |

Embodiment 3

Table 3 shows one example of the magnetic characteristics (shown are average values of those of ten samples) of multilayered films each constituted by a main ferromagnetic mterial film of an amorphous alloy consisting of $Co_{89}W_3Zr_8$ and a spacer ferromagnetic material layer of an amorphous alloy consisting of $Co_{80}Mo_{9.5}Zr_{10.5}$.

TABLE 3

| No. | Main ferromagnetic material film $Co_{89}W_3Zr_8$ | Spacer ferromagnetic marerial layer $Co_{80}Mo_{9.5}Zr_{10.5}$ | Entire film thickness (μm) | Bs (KG) | Hc (Oe) | μ 5 MHz |
|---|---|---|---|---|---|---|
| 8 | 0.1 μm (4 layers) | 50 Å (3 layers) | 0.4 | 12 | 0.2 | 5000 |
| 9 | 0.1 μm (10 layers) | 50 Å (9 layers) | 1.0 | 12 | 0.15 | 4000 |
| 10 | 0.1 μm (10 layers) | 100 Å (9 layers) | 1.1 | 11 | 0.15 | 3500 |

This embodiment shows one example of a multilayered ferromagnetic amorphous alloy film constituted by a main ferromagnetic material film of a ternary system amorphous alloy having a composition consisting of Co-T-Zr where T represents one element which is selected from the group consisting of W, Mo, Nb, Ta, B, Ni, Al, Cr, etc. and is properly added to Co and Zr. In the case of this embodiment, although the saturation flux density Bs is slightly lowered, the coercive force Hc is favorably decreased, and the relative permeability μ is conveniently increased. Further, the crystallization temperature exceeds 500°C.; therefore, it is possible to obtain a multilayered film having excellent thermal stability. As the spacer ferromagnetic material layer is employed an alloy film of a constituent element combination different from that of the main ferromagnetic material film.

For instance, it is possible to obtain a multilayered film with excellent thermal stability by the following combinations of alloy films.

| No. | Main ferromagnetic material film | Spacer ferromagnetic material layer | Crystallization temperature |
|---|---|---|---|
| i | $Co_{87}Nb_5Zr_8$ | 80Ni—20Fe | 530° C. |
| ii | $Co_{80}Mo_{9.5}Zr_{10.5}$ | 80Ni—20Fe | 540° C. |
| iii | $Co_{87}Zr_8B_5$ | 80Ni—20Fe | 500° C. |
| iv | $Co_{87}Nb_5Zr_8$ | $Co_{80}Mo_{9.5}Zr_{10.5}$ | 520° C. |
| v | $Co_{80}Mo_{9.5}Zr_{10.5}$ | $Co_{89}W_3Zr_8$ | 530° C. |
| vi | $Co_{87}Zr_8B_5$ | $Co_{80}Mo_{9.5}Zr_{10.5}$ | 500° C. |

Similar to that obtained in each of the embodiments 1, 2, the multilayered ferromagnetic amorphous alloy film obtained in this embodiment remarkably excels the conventional one in magnetic characteristics, peeling resistance, patterning accuracy and so forth.

Embodiment 4

The following is a description of one embodiment of a magnetic head employing the multilayered ferromagnetic amorphous alloy film of the present invention.

Figure 4A:
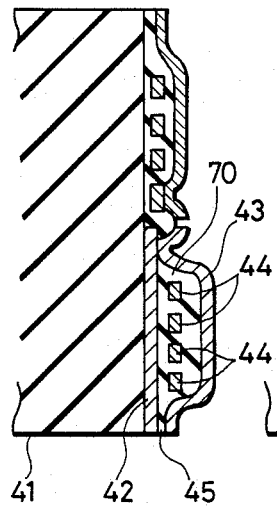
FIGS. 4a and 4b are respectively a sectional side elevational view and a top plan view of a magnetic head in accordance with another embodiment of the present invention.
Figure 4B:
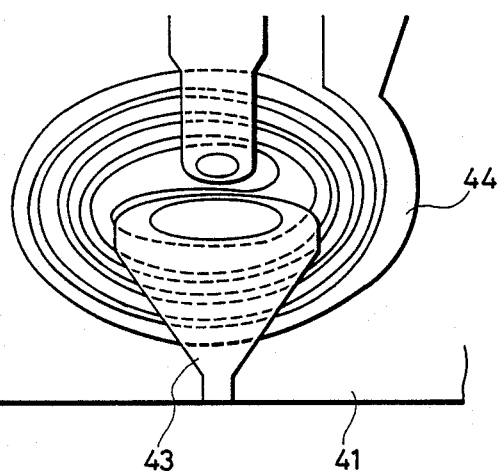

FIGS. 4a and 4b in combination show one example of a thin-film magnetic head. FIG. 4a is a sectional view of the magnetic head, while FIG. 4b is a top plan view thereof. In these Figures: the reference numeral 41 denotes a non-magnetic substrate; 42 a lower magnetic material film; 43 an upper magnetic material film; 44 a conductor coil; 45 a functional gap; and 70 a non-magnetic insulating layer of $SiO_2$ or a high-polymer resin, for example. In FIG. 4b, the portion of the conductor coil 44 under the upper layers such as the upper magnetic material film 43 is also shown in a see-through manner in order to facilitate understanding of the structure of the magnetic head. In this embodiment, a ferromagnetic material film having a film thickness of several microns is employed, and as the multilayered ferromagnetic amorphous alloy film, No. 4 in Table 1 and Nos. 9 and 10 in Table 3 may be employed.

In the above-described magnetic head, the ferromagnetic material films are formed on the substrate 41 of Photoceram (a trade name, manufactured by Corning Works, U.S.A.) and are then patterned into a predetermined shape by a patterning technique of thin film, such as photo etching. In this embodiment, photo etching was carried out by an ordinary patterning process of thin film in which, after pretreatment of the substrate, the following treatments are carried out in order: photo resist coating, pre-bake, exposure, development, rinse, post-bake, etching and removal.

As the photo resists, series of Az-1300 and Az-1400 (trade names, manufactured by Shipley Works, U.S.A.) were employed. The employed wet etchants had a composition ratio of HF(46 %) 3: $HNO_3$ 25: $CH_3COOH$ 15. The etching was carried out at the room temperature.

Figure 5A:
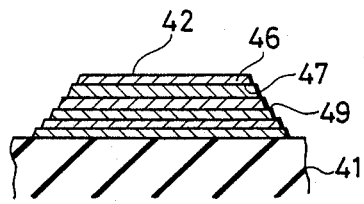
FIGS. 5a and 5b are sectional views respectively showing the shape of a conventional multilayered ferromagnetic amorphous alloy film and that of a multilayered ferromagnetic amorphous alloy film in accordance with another embodiment of the present invention, the films having already being subjected to patterning.
Figure 5B:
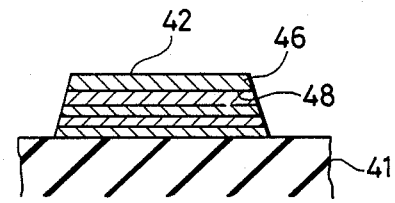

FIGS. 5a and 5b are sectional views respectively showing the conventional multilayered film and one example of the multilayered films of the present invention, each of the multilayered films being obtained by forming the lower ferromagnetic material film 42 on the substrate 41 and then patterning the film 42 by photo etching. FIG. 5a shows a patterned example of a conventional multilayered film constituted by ferromagnetic amorphous alloy films 46 laminated one upon another with $SiO_2$ 47 interposed therebetween as a spacer material layer. FIG. 5b shows a patterned example of the multilayered film of the invention which is constituted by ferromagnetic amorphous alloy films 46 laminated one upon another with a ferromagnetic alloy 48 interposed therebetween as a spacer material layer. As will be clear from the Figures, in the conventional multilayered film having the insulator of $SiO_2$ as a spacer material layer, a step of about 0.05 to 0.5 $\mu$m is undesirably formed at an edge portion 49 of each of the layers, thus making impossible to effect accurate patterning, whereas, in the case of employment of the multilayered film of the invention, it is possible to pattern each edge portion 49 with high accuracy. Further, the conventional multilayered film suffers from a problem of, for example, separation at the spacer material layer during patterning, whereas the multilayered film of the present invention is free from such problem.

Embodiment 5

The following is a description of one embodiment of the present invention in which the invention is applied to another kind of magnetic head.

Figure 6:
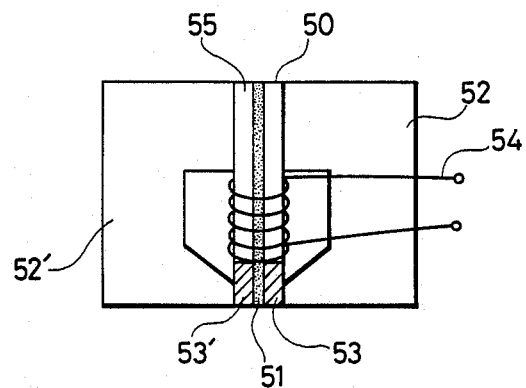
FIG. 6 is a plan view of a magnetic head in accordance with a further embodiment of the present invention.

FIG. 6 is a plan view of one example of the magnetic heads employed in the perpendicular magnetic recording method. Referring to FIG. 6 which shows a magnetic head which effects recording at a main magnetic pole 50, the main magnetic pole 50 is constituted by a main pole ferromagnetic material film 51 backed with a ferromagnetic Mn-Zn ferrite 55. In the Figure: the reference numerals 52, 52' denote auxiliary pole cores of a ferromagnetic Mn-Zn ferrite; 53, 53' a non-magnetic material such as glass; and 54 a coil. The multilayered ferromagnetic amorphous alloy film of the invention is employed as the main pole ferromagnetic material film 51. In order to attain high-density magnetic recording, it is necessary to employ as the main pole ferromagnetic material film an extremely thin film on the order of 0.2 $\mu$m to 0.5 $\mu$m. For this reason, there is a need for a ferromagnetic material thin film which is excellent in high-frequency recording characteristics and has high saturation flux density in order to prevent magnetic saturation. The multilayered ferromagnetic amorphous alloy film of the invention is preferable as the main pole ferromagnetic material film. Multilayered ferromagnetic amorphous alloy films particularly suitable for the magnetic head in accordance with this embodiment include Nos. 1, 2 and 3 in Table 1, Nos. 5, 6 and 7 in Table 2 and No. 8 in Table 3. By employing these multilayered ferromagnetic amorphous alloy films, it was possible to obtain preferable characteristics.

Figure 7:
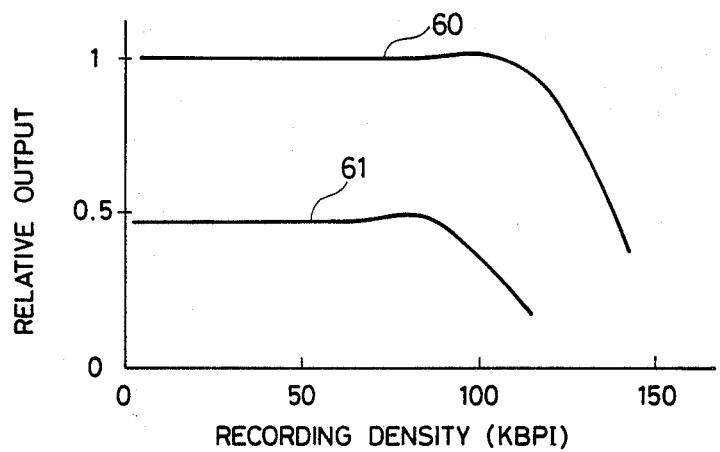
FIG. 7 is a graph showing characteristics obtained in the case of employment of a multilayered film of the invention for a main pole of a perpendicular magnetic recording head and those obtained in the case of employment of a conventional single layered film for the same main pole.

FIG. 7 shows the results of evaluation of the recording and reproducing characteristics of the magnetic recording effected by the use of the magnetic head shown in FIG. 6 employing the multilayered film No. 2, on a known perpendicular magnetic recording medium obtained by forming a Co-20 wt % Cr film on a glass substrate. In FIG. 7, the curve 60 represents the characteristics of the magnetic head in accordance with this embodiment, while the curve 61 represents the characteristics of a magnetic head having the same structure as the above-described magnetic head and employing a single layered film of $Co_{90.5}Zr_{9.5}$ having a thickness of 0.4 $\mu$m. It will be understood from the Figure that the present invention makes it possible to effect recording at a higher density and to obtain a higher output. In FIG. 7, the ordinate represents the relative output, while the abscissa represents the recording density KBPI (Kilo-Bit Per Inch).

As has been described above in detail, the present invention provides a multilayered ferromagnetic amorphous alloy film which has low coercive force and high permeability as well as high saturation flux density and is easily patterned as well as is free from ply separation by laminating ferromagnetic amorphous alloy films one upon another with a ferromagnetic material different from the alloy films interposed therebetween as a spacer material layer. Further, the magnetic head of the present invention, employing the above-described multilayered ferromagnetic amorphous alloy film of the invention for, at least, a portion of the magnetic pole of the magnetic head on the magnetic recording medium side thereof remarkably excels in recording and reproducing characteristics the conventional magnetic head employing a single layered ferromagnetic material film. In particular, in the case where the invention is applied to a thin-film magnetic head, it becomes remarkably easy to effect patterning of the ferromagnetic material film to be a magnetic pole, and the patterning accuracy is also increased, as compared with the thin-film magnetic head employing the conventional multilayered film having a spacer material layer constituted by a non-magnetic insulating film, such as $SiO_2$.

Obviously many modifications and variations of the present invention are possible in the light of the above teachings. It is therefore to be understood that within the scope of the appended claims the invention may be practiced otherwise than as specifically described.

What is claimed is:

1. A multilayered ferromagnetic amorphous alloy film comprising: a plurality of main ferromagnetic material films of a ferromagnetic amorphous alloy laminated one upon another with a spacer ferromagnetic material layer interposed therebetween, said spacer ferromagnetic material layer being a ferromagnetic material different from said ferromagnetic alloy, wherein the thickness of each of the layers constituted by said main ferromagnetic material films is 0.05 to 2 $\mu$m and the thickness of each layer constituted by said spacer ferromagnetic material layer is 10 to 200 Å.

2. A multilayered ferromagnetic amorphous alloy film according to claim 1, wherein each of said main ferromagnetic material films is made of one amorphous alloy selected from the group consisting of a Co-Zr system alloy, a Co-Nb system alloy, a Co-Ti system alloy, an Fe-B system alloy, an Fe-Si-B system alloy, an Fe-Co-Si-B system alloy and a Co-Ni-Zr system alloy.

3. A multilayered ferromagnetic amorphous alloy film according to claim 2, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

4. A multilayered ferromagnetic amorphous alloy film according to claim 2, wherein each of said main ferromagnetic material films is made of an amorphous alloy having a composition consisting essentially of one alloy selected from the group consisting of a Co-Zr system alloy, a Co-Nb system alloy and a Co-Ti system alloy, and at least one element selected from the group consisting of W, Mo, Ti, Nb, Ta, Si and B.

5. A multilayered ferromagnetic amorphous alloy film according to claim 4, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

6. A multilayered ferromagnetic amorphous alloy film according to claim 1, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

7. A magnetic head comprising: a multilayered ferromagnetic amorphous alloy film formed by laminating a plurality of main ferromagnetic material films of a ferromagnetic amorphous alloy while interposing a spacer ferromagnetic material layer of a ferromagnetic material different from said ferromagnetic alloy between said main ferromagnetic material films, said multilayered ferromagnetic amorphous alloy film constituting, at least, one portion of a core of said magnetic head, wherein the thickness of each of the layers constituted by said main ferromagnetic material films is 0.05 to 2 $\mu$m and the thickness of each layer constituted by said spacer ferromagnetic material layer is 10 to 200 Å.

8. A magnetic head according to claim 7, wherein, at least, a portion on a magnetic recording medium side of a magnetic pole effecting generation or both generation and detection of a signal magnetic field is constituted by said multilayered film.

9. A magnetic head according to claim 8, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

10. A magnetic head according to claim 8, wherein, at least, a portion of a magnetic pole of a ring type magnetic head in the vicinity of a magnetic gap is constituted by said multilayered film.

11. A magnetic head according to claim 8, wherein, at least, a distal end portion of the main magnetic pole of a perpendicular magnetic recording head having a main magnetic pole and an auxiliary magnetic pole is constituted by said multilayered film.

12. A magnetic head according to claim 8, wherein each of said main ferromagnetic material films is made of one amorphous alloy selected from the group consisting of a Co-Zr system alloy, a Co-Nb system alloy, a Co-Ti system alloy, an Fe-B system alloy, an Fe-Si-B system alloy, an Fe-Co-Si-B system alloy and a Co-Ni-Zr system alloy.

13. A magnetic head according to claim 12, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

14. A magnetic head according to claim 12, wherein each of said main ferromagnetic material films is made of an amorphous alloy having a composition consisting essentially of one alloy selected from the group consisting of a Co-Zr system alloy, a Co-Nb system alloy and a Co-Ti system alloy, and at least one element selected from the group consisting of W, Mo, Ti, Nb, Ta, Si and B.

15. A magnetic head according to claim 14, wherein said spacer ferromagnetic material layer is made of an amorphous alloy of a constituent element combination different from that of said main ferromagnetic material films, or one ferromagnetic polycrystalline material selected from the group consisting of Co element, Ni element, Fe element, an Ni-Fe system alloy and an Fe-Al-Si system alloy.

16. A multilayered ferromagnetic amouphous alloy film according to claim 1, wherein said multilayered ferromagnetic amorphous alloy film has a coercive force of less than or equal to 0.5 Oe and a permeability of at least 2000 at 5 MHz.

17. A magnetic head according to claim 8, wherein said multilayered ferromagnetic amorphous alloy film has a coercive force of less than or equal to 0.5 Oe and a permeability of at least 2000 at 5 MHz.

* * * * *